(12) United States Patent
Van Rooyen

(10) Patent No.: US 7,676,671 B2
(45) Date of Patent: Mar. 9, 2010

(54) SYSTEM FOR MULTI-PROFILE BOOT SELECTION OF AN EMBEDDED DEVICE

(75) Inventor: Robert M. Van Rooyen, Foresthill, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 670 days.

(21) Appl. No.: 11/554,761

(22) Filed: Oct. 31, 2006

(65) Prior Publication Data

US 2008/0104386 A1    May 1, 2008

(51) Int. Cl.
*G06F 9/445* (2006.01)

(52) U.S. Cl. .................. 713/2; 713/1; 713/100

(58) Field of Classification Search ........... 713/1, 713/2, 100
See application file for complete search history.

(56) References Cited

U.S. PATENT DOCUMENTS

| | | | |
|---|---|---|---|
| 5,793,943 A * | 8/1998 | Noll ............... | 714/6 |
| 6,438,687 B2 * | 8/2002 | Klein .............. | 713/1 |
| 6,625,754 B1 * | 9/2003 | Aguilar et al. ...... | 714/15 |
| 6,651,188 B2 * | 11/2003 | Harding et al. ...... | 714/38 |
| 6,665,813 B1 * | 12/2003 | Forsman et al. ..... | 714/15 |
| 7,376,761 B2 * | 5/2008 | Dubal et al. ........ | 710/8 |
| 7,409,539 B2 * | 8/2008 | Arnez et al. ........ | 713/100 |
| 7,409,584 B2 * | 8/2008 | Denninghoff et al. .. | 714/6 |
| 7,475,389 B2 * | 1/2009 | Johnson ............. | 717/135 |
| 2005/0251673 A1 * | 11/2005 | Bosley et al. ....... | 713/2 |
| 2006/0155979 A1 * | 7/2006 | Blinick et al. ...... | 713/2 |
| 2007/0094489 A1 * | 4/2007 | Ota et al. .......... | 713/2 |
| 2007/0150717 A1 * | 6/2007 | Chen ................ | 713/2 |

* cited by examiner

*Primary Examiner*—Nitin C Patel

(57) ABSTRACT

A system for multi-profile boot selection of an embedded device and method therefor are described. The system comprises a storage device reader, a processing device, and a memory. The processing device communicates with the storage device reader and the memory stores instructions including a boot controller which, when executed by the processing device, interacts with the storage device reader and automatically generates a default boot configuration file based on determining a failure from interaction with the storage device reader.

15 Claims, 6 Drawing Sheets

```

# Main boot loader section

[boot]
default=primary, secondary, development, test
last=primary
timeout=10

# Boot profile for primary product code image

[primary]
image=/cfa0/092804.swi
config=/cfa0/093004.cfg
status=ok
description="Primary boot image"

# Boot profile for secondary product code image

[secondary]
image=/cfa0/081004.swi
config=/cfa0/090104.cfg
status=unknown
description="Secondary boot image"

# Boot profile for system testing

[test]
image=/ufa0/ntc/bttf_special.swi
config=/ufa0/ntc/092304.cfg
status=failure
description="Test boot image"
```

FIG. 3

SYSTEM FOR MULTI-PROFILE BOOT SELECTION OF AN EMBEDDED DEVICE

BACKGROUND

Embedded systems comprises focused, limited, and/or single purpose devices for performing a particular set of functionality. Examples of embedded systems comprise specialized device and/or machinery controllers, communication components such as networking devices, etc. Operating system and application software for embedded systems are often combined into a minimal software set for controlling operation of the embedded systems. The combined software set enables booting of the embedded system into an operational state through the use of a boot configuration file accessed at boot (or startup time) which specifies particular parameters used in conjunction with the combined software set.

As such, embedded systems do not comprise the capability to boot using different combined software sets and/or boot configuration files without performing an upgrade (or modification or replacement) of the existing combined software set installed on the system. A static mechanism for booting embedded systems has been used in the past. Additionally, embedded systems did not provide the capability to access and use differing boot configuration files.

DESCRIPTION OF THE DRAWINGS

The present invention is illustrated by way of example, and not by limitation, in the figures of the accompanying drawings, wherein elements having the same reference numeral designations represent like elements throughout and wherein:

FIG. 3 is an example boot configuration file according to an embodiment;

DETAILED DESCRIPTION

Figure 1:
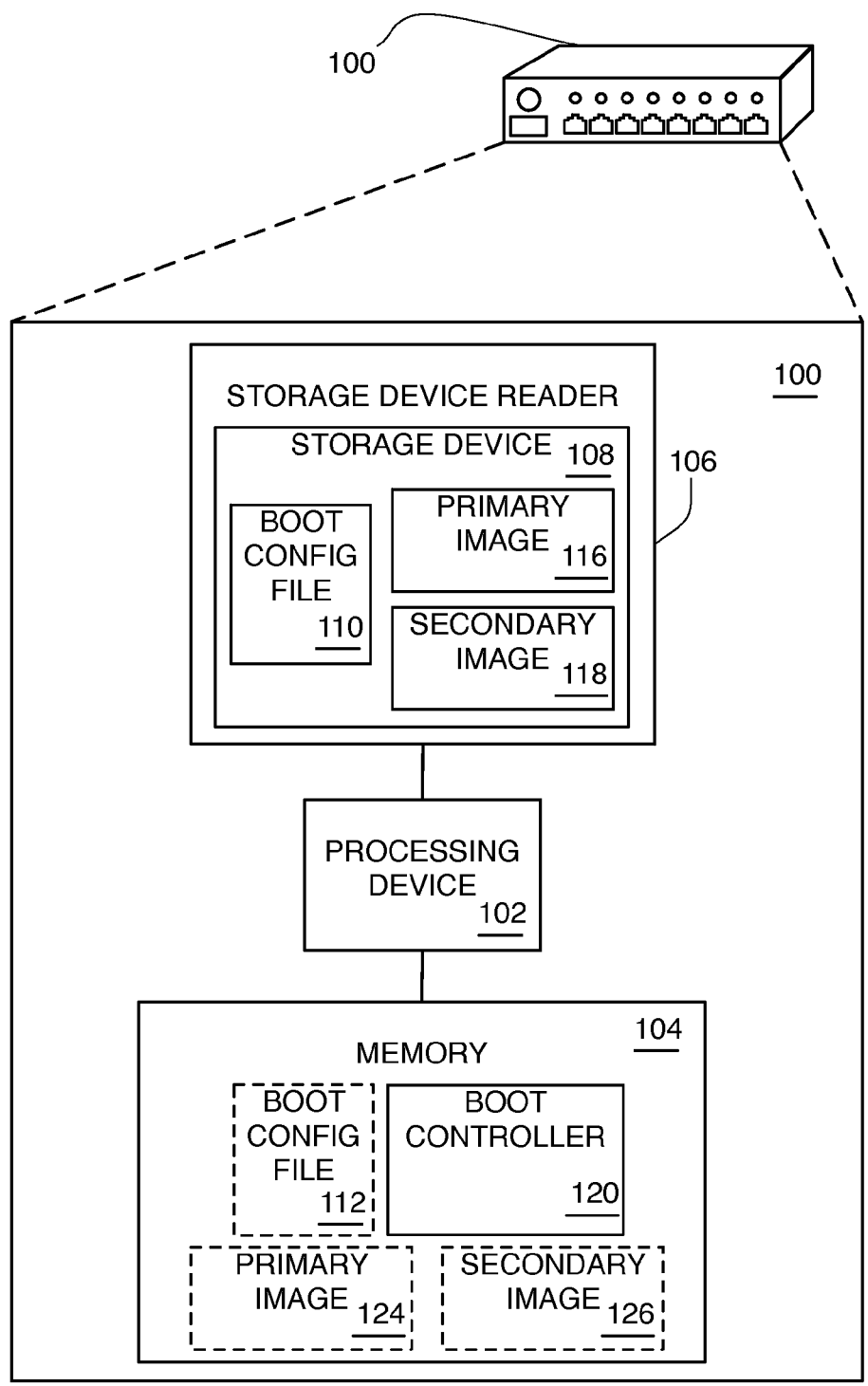
FIG. 1 is a high level functional block diagram of an embodiment.

FIG. 1 depicts a high level block diagram of an embodiment of an embedded system 100, e.g., a network switch or other single purpose device. As used herein, an embedded system refers to a specialized computer-based device wherein operating system and application functionality may be combined. In some instances, an embedded system may comprise a fixed set of functionality programmed into a memory, e.g., a non-volatile memory.

As depicted in FIG. 1, embedded system 100 comprises a processing device 102 for controlling operation of the system, a memory 104 for storing instructions for execution by the processing device, and a storage device reader 106 for communicating with a storage device 108. According to an embodiment, on startup of embedded system 100, processing device 102 executes instructions stored in memory 104 which cause the processing device to communicate with storage device reader 106. Processing device 102 queries storage device reader 106 to determine whether storage device 108 is in communication with the storage device reader and whether the storage device comprises a boot configuration file 110. Boot configuration file 110 specifies boot parameters for the startup and configuration of embedded system 100 and is described in further detail below.

If storage device reader 106 indicates the presence of storage device 108 and the storage device 108 fails to comprise a boot configuration file 110, processing device 102 generates and stores a boot configuration file on the storage device. Automatically generated boot configuration file 110 on storage device 108 comprises a specification of at least a primary image 116 on the storage device to be used in booting embedded system 100. In at least some embodiments, generated boot configuration file 110 comprises a specification as follows:

```
[boot]
default=console,primary,secondary
last=primary
timeout=5
[primary]
image=/cfa0/primary.swi
config=/cfa0/primary.cfg
status=good
description=Primary Software Image
[secondary]
image=/cfa0/secondary.swi
config=/cfa0/secondary.cfg
status=good
description=Secondary Software Image
[console]
description=Monitor ROM Console
```

Primary image, and secondary image described below, refer to a combined software set, e.g., operating system and application functionality, or product code executed by processing device 102 to control operation of embedded system 100.

Processing device 102 also determines whether primary image 116 is present on storage device 108 and, if available, whether the primary image is bootable or non-bootable, e.g., corrupt. If primary image 116 is present and bootable, processing device 102 proceeds to boot embedded system 100 using the primary image. If primary image 116 is non-bootable or not present on storage device 108, processing device 102 determines whether a secondary image 118 is present on storage device 108 and, if available, whether the secondary image is bootable or non-bootable. Similar to primary image 116 above, if secondary image 118 is present and bootable, processing device 102 proceeds to boot embedded system 100 using the secondary image. If secondary image 118 is non-bootable or not present on storage device 108, processing device 102 proceeds to automatically generate a default boot configuration file 112 in memory 104 and enable editing of the default boot configuration file by a user. In this manner, embedded system 100 is able to automatically generate a boot configuration file for a product code to be used to boot the embedded system. In some embodiments, a minimal boot loader application, i.e., a set of executable instructions, is stored on storage device 108 and executes to present a command line interface (CLI) if primary image 116 and secondary image 118 are missing or corrupt. The boot loader application enables the user to recover system 100 via download of a primary image, e.g., using an Xmodem transfer mechanism.

Returning now to FIG. 1 in detail, processing device 102 may be a processor, a microprocessor, and/or other logic devices usable to execute a set of instructions to perform requested functionality, e.g., to control operation of embedded system 100. In an embodiment, embedded system 100 is a network switch and processing device 102 is a POWERPC processor, e.g., an MPC8540, available from Freescale Semiconductor, Inc. of Phoenix, Ariz.

Embedded system 100 also comprises memory 104, such as a random access memory (RAM) or other storage device, coupled to processing device 102 for storing data, variables, intermediate information, and instructions to be executed by the processing device. Memory 104 may be a static storage device or dynamic storage device for storing information and instructions for processing device 102. Memory 104 may comprise either or both of static or dynamic memory, e.g., RAM or read-only memory (ROM).

Memory 104 may comprise the above-mentioned boot configuration file 112 (dashed line), a boot controller 120, e.g., a boot loader application, an optional primary image 124 (dashed line), and an optional secondary image 126 (dashed line). Processing device 102 reads boot configuration file 112, e.g., a "boot.ini" file, in order to determine how to boot a product code embodied by either primary image 124, secondary image 126, or primary image 116 and/or secondary image 118 on storage device 108. As described below, boot configuration file 112 may be stored on one or more storage devices, similar to storage device 108, readable by storage device reader 106.

Figure 2:
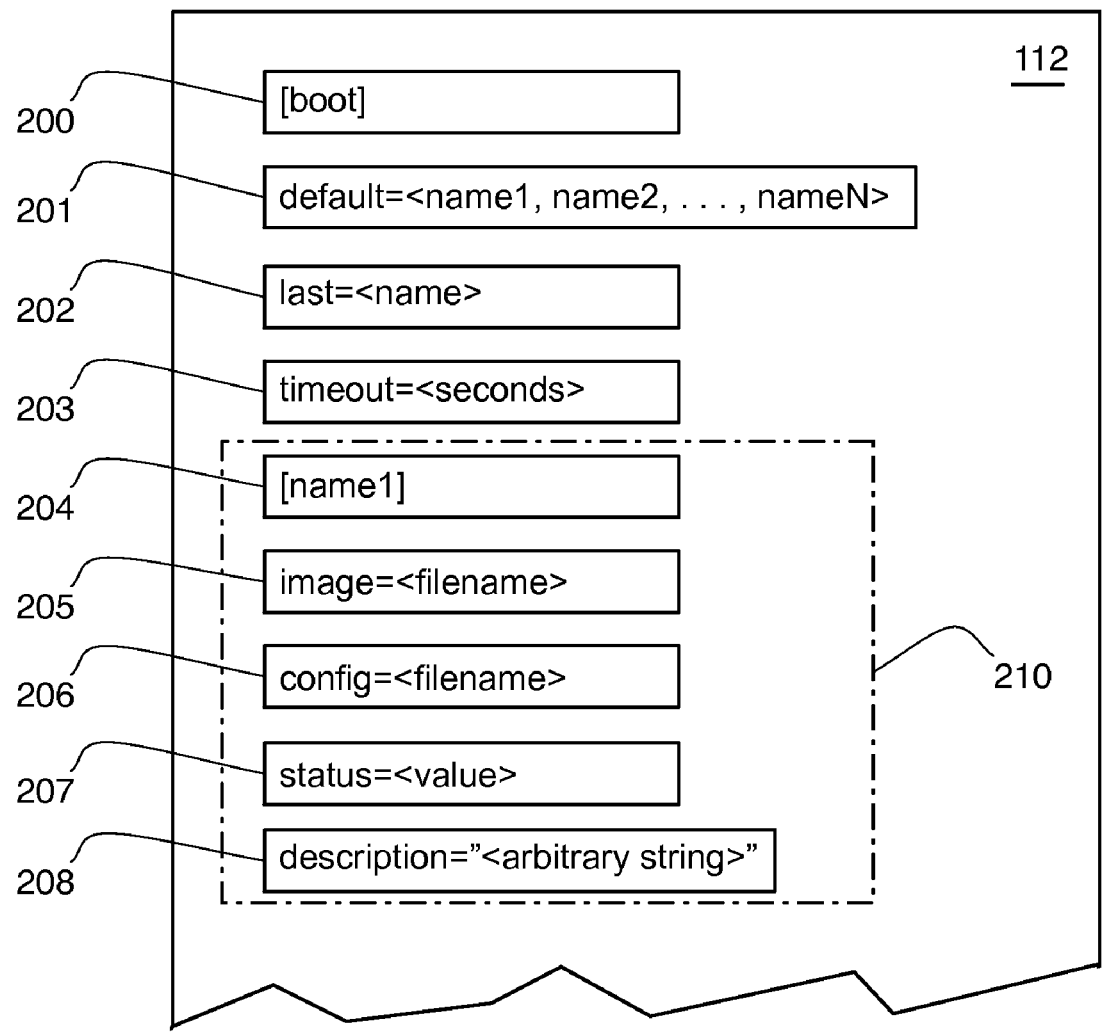
FIG. 2 is a boot configuration file field list according to an embodiment.

Boot configuration file 112 may have the format depicted in FIG. 2. FIG. 2 depicts at least a portion of a template-style listing of fields of a boot configuration file 112. In particular, boot configuration file 112 comprises a boot field 200 indicating a section break in the file. In some embodiments, boot field 200 is required in order for boot configuration file 112 to be considered a valid boot configuration file. Default field 201 comprises a list of available boot profiles (described below) comprised in boot configuration file 112.

Last field 202 indicates the name of the last profile which was booted by embedded system 100. Timeout field 203 is optional and comprises a timeout parameter for aborting or selecting a specific boot profile by processing device 102. In some embodiments, a user may specify a predetermined value for timeout field 203.

Boot configuration file 112 comprises a name field 204 which is a defineable section name for a particular boot profile. The contents of name field 204 corresponds to one of the boot profiles listed in default field 201. In some embodiments, name field 204 is a user-definable field.

Image field 205 is an identifier of the product code, e.g., primary image or secondary image, to which the particular boot profile applies. Config field 206 is an identifier of a product code configuration file to be used in booting the particular product code on embedded system 100.

Status field 207 indicates the status of the particular boot profile. Description field 208 is a user readable description of the particular boot profile. Dash-dot line 210 indicates the contents of a particular boot profile including name field 204, image field 205, config field 206, status field 207, and description field 208. In a given boot configuration file 112, there may be one or more boot profiles and the name, i.e., contents of name field 204, of each boot profile is comprised in default field 201.

Boot configuration file 110 on storage device 108 follows the same format as boot configuration file 112. FIG. 3 depicts a portion of a sample boot configuration file 110 as used in an embodiment. Hash marks ("#") at the beginning of a line indicate processing device 102 need not read and/or execute the particular line, e.g., comments exist on the particular line.

Figure 4:
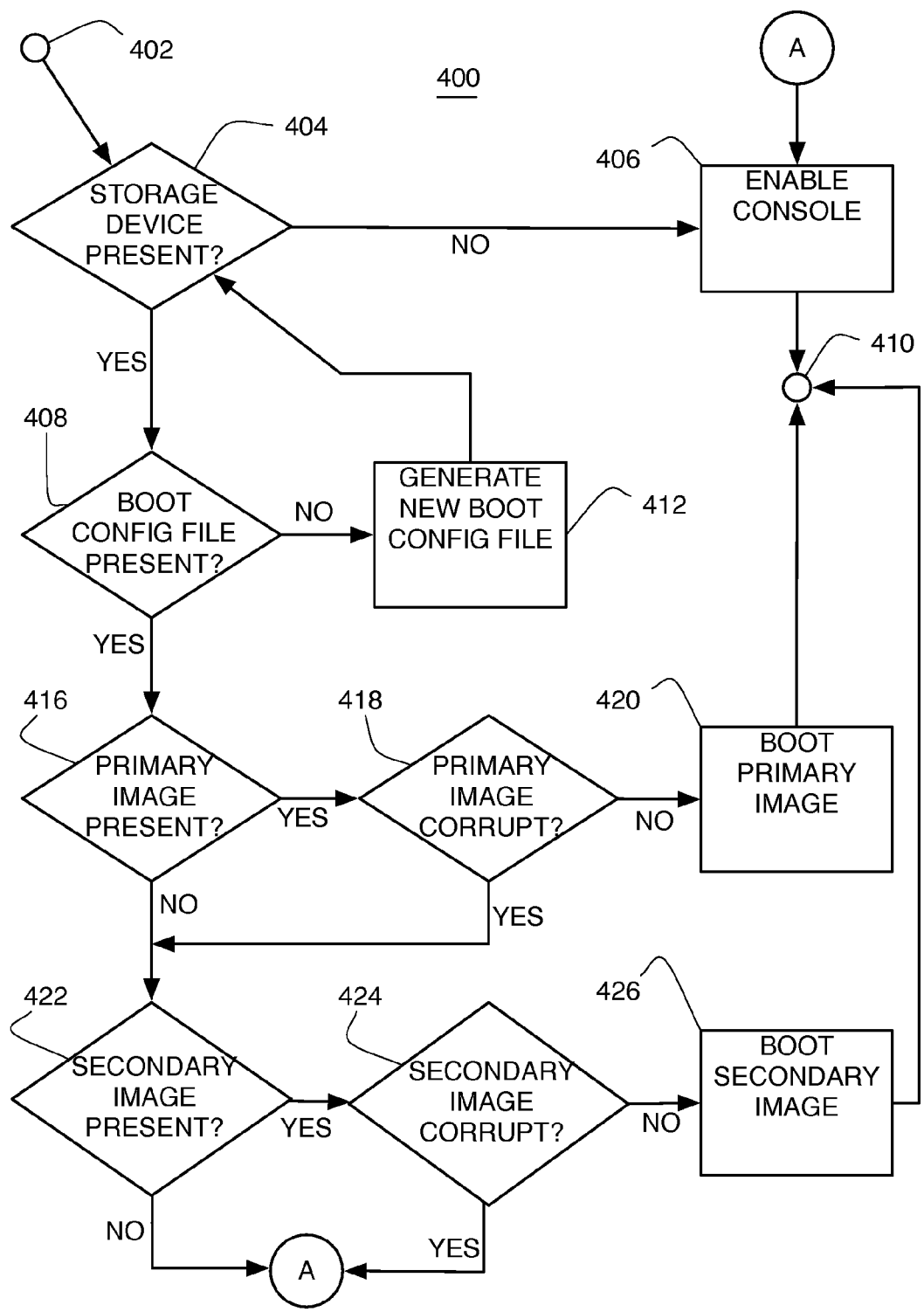
FIG. 4 is a high level process flow chart of operation according to an embodiment.

Boot controller 120, e.g., a boot ROM, comprises instructions executed by processing device 102 controlling the boot operations of embedded system 100. Boot controller 120 causes processing device 102 to query storage device reader 106 for information concerning storage device 108 and if a boot configuration file 110 is not present on the storage device, then processing device 102 automatically generates a boot configuration file on the storage device and continues to attempt to boot embedded system 100. FIG. 4, described in detail below, depicts a portion of operation of boot controller 120.

System 100 also comprises storage device reader 106 for reading the contents of a storage device 108 in communication with the reader. Storage device reader 106 may be a compact flash or other media card reader capable of receiving and reading information from storage device 108. In some embodiments, storage device reader 106 may read and/or write information to/from storage device 108. In some embodiments, storage device reader 106 may read and/or write to more than one storage device type.

Storage device 108 may be an advanced technology attachment (ATA)-based device, e.g., a compact flash-based device, a universal serial bus (USB)-based device, a personal computer memory card international association (PCMCIA)-based device, a network file system (NFS) mount, a non-removable flash device, a hard disk, a compact disc, a digital versatile disc, a tape drive or another removable/processor-connectable memory-based device for reading and writing information. Storage device 108, in some embodiments, may be fixedly connected and/or removably connected with storage device reader 106.

FIG. 4 depicts a high level process flow chart of a portion 400 of operation of boot controller 120 (FIG. 1) as executed by processing device 102. Processing device 102 (FIG. 1) begins execution of portion 400 of boot controller 120 at start step 402 and the flow of control proceeds to step 404. At step 404, boot controller 120 (FIG. 1) queries storage device reader 106 to determine whether storage device 108 is presently connected and in communication with the reader.

Based on a reply signal received from storage device reader 106 (FIG. 1), the flow of control of boot controller 120 proceeds to either step 406 if the reply signal is negative, indicating an absence or lack of communication ability with storage device 108 in the reader, or step 408 if the reply signal is positive, indicating a presence of the storage device in the reader.

At step 406, boot controller 120 (FIG. 1) automatically generates a default boot configuration file 112 (dashed line) in memory 104 and enables the provision of an interactive interface to a user enabling the user to modify the default boot configuration file. In this manner, embedded system 100 (FIG. 1) provides an interface by which a user may edit default boot configuration file 112 in order to cause the system to boot using a storage device 108. The flow of control then proceeds to step 410 and the process portion ends, e.g., embedded system 100 may boot and be operational. In some instances, the user may be able to cause embedded system 100 (FIG. 1) to reboot and begin portion 400 again at step 402 using the user-edited boot configuration file 112.

In some embodiments, at step 406, a user is able to set the value of timeout field 203 (FIG. 2), as well as, view the value in last field 202 in order to determine the previous product code booted. Additionally, the user may be able to view the value of status field 207 (FIG. 2) to determine the current product code status, e.g., executing, corrupt, etc.

Returning to step 408, boot controller 120 (FIG. 1) queries storage device reader 106 to determine whether storage device 108 comprises a boot configuration file 110. If storage device reader 106 (FIG. 1) replies negatively (NO), indicating the absence of boot configuration file 110, the flow of control proceeds to step 412 and boot controller 120 proceeds to generate a default boot configuration file in memory 104 and enable the provision of an interactive interface to the user, and the flow returns to step 404. The interactive interface enables the user to modify the default boot configuration file. In some embodiments, storage device reader 106 replies negatively indicating a corrupt boot configuration file 110.

Returning now to step 408, if storage device reader 106 (FIG. 1) replies positively (YES), indicating the presence of boot configuration file 110, the flow of control proceeds to step 416.

At step 416, boot controller 120 (FIG. 1) queries storage device reader 106 to determine whether primary image 116 is present on storage device 108. If primary image 116 (FIG. 1) is present on storage device 108, the flow of control proceeds to step 418 and boot controller 120 determines whether the primary image is corrupt. For example, boot controller 120 (FIG. 1) checks a checksum validity and/or bootable status of primary image 116 to determine if the primary image is corrupt. If primary image 116 (FIG. 1) is corrupt the flow of control proceeds to step 422. If primary image 116 (FIG. 1) is not corrupt, the flow of control proceeds to step 420 and boot controller 120 proceeds to boot the primary image based on the generated default boot configuration file 110. The flow of control then proceeds to end step 410, as described above.

Returning to step 422, boot controller 120 (FIG. 1) queries storage device reader 106 to determine whether secondary image 118 is present on storage device 108. If secondary image 118 (FIG. 1) is present on storage device 108, the flow of control proceeds to step 424 and boot controller 120 determines whether the secondary image is corrupt. If secondary image 118 (FIG. 1) is corrupt the flow of control proceeds to step 406. If secondary image 118 (FIG. 1) is not corrupt, the flow of control proceeds to step 426 and boot controller 120 proceeds to boot the secondary image based on the generated default boot configuration file 110. The flow of control then proceeds to end step 410, as described above. If secondary image 118 (FIG. 1) is corrupt, the flow of control proceeds to step 406.

In some embodiments, a user may be presented, via a display, with a menu during a timeout period specified in the configuration file enabling the user to select which profile to boot the embedded system 100. If the user does not select a profile from which to boot system 100, then the last profile specified in the configuration is used to boot the system.

In another embodiment in which memory 104 (FIG. 1) comprises one or each of boot configuration file 112, primary image 124, and secondary image 126, boot controller 120 executes a modified portion 500 of the process flow depicted in FIG. 4. Specifically, portion 500 lacks the storage device present check performed at step 404 (FIG. 4) and operations performed at steps 408, 412, 416, 418, 420, 422, 424, and 426 are executed with respect to the contents of memory 104 (FIG. 1) and one or each of boot configuration file 112, primary image 124, and secondary image 126. Portion 500 begins execution at start step 502 and proceeds to step 408 and the flow of control proceeds as described above with respect to FIG. 4.

Figure 5:
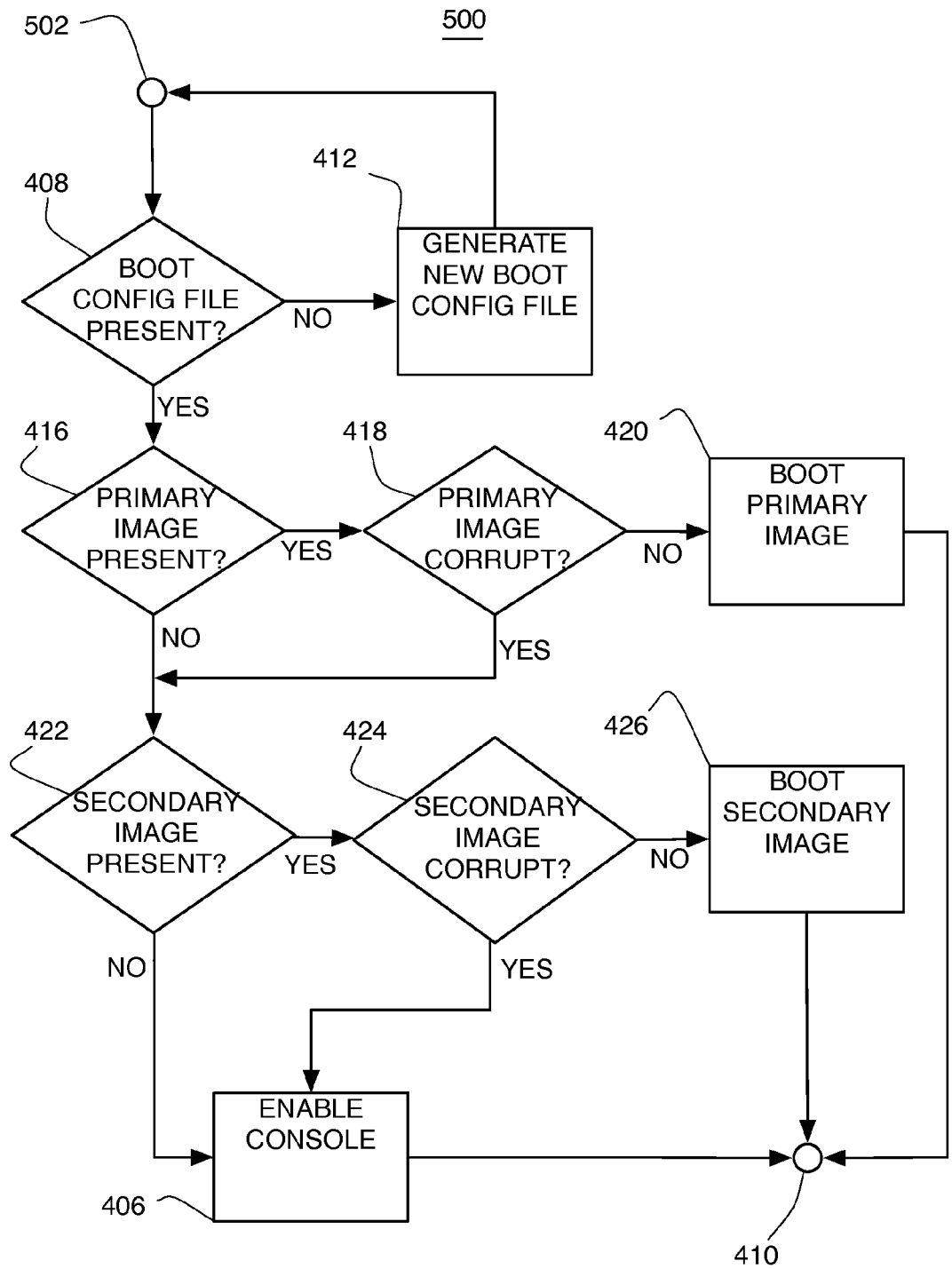
FIG. 5 is a high level process flow chart of operation according to another embodiment.

In a further embodiment, the FIGS. 4 and 5 embodiment operations may be combined to enable boot controller 120 (FIG. 1) to check both storage device reader 106 and memory 104 for a boot configuration file 110, 112 and a primary or secondary image 116, 118, 124, 126.

Figure 6:
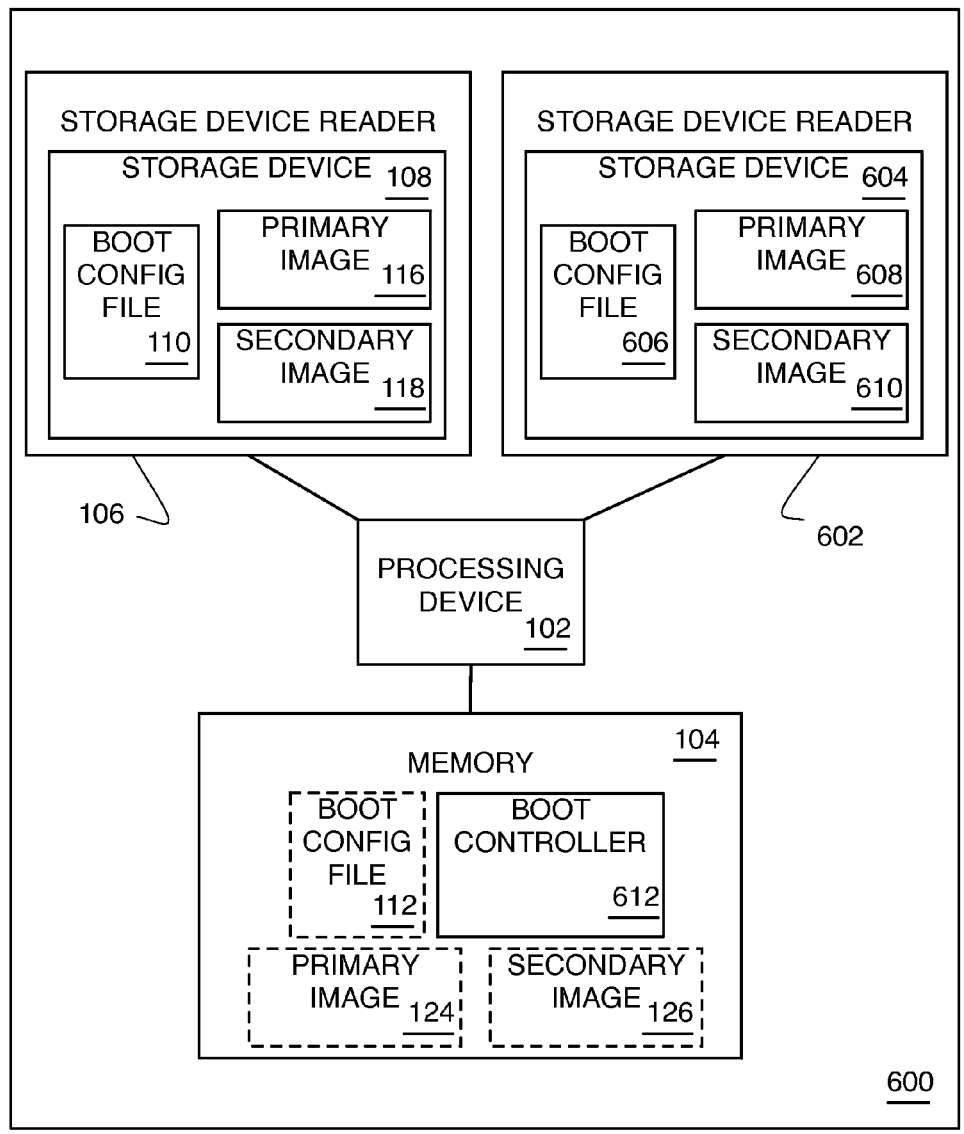
FIG. 6 is a high level functional block diagram of another embodiment.

FIG. 6 depicts another embodiment of an embedded system 600 similar to embedded system 100 (FIG. 1) in which the embedded system comprises a second storage device reader 602 connected with processing device 102. Second storage device reader 602 (as described above with respect to storage device reader 106) may be the same type of device reader as storage device reader 106 or the second reader may be configured to read a different type of storage device. Second storage device reader 602 is capable of communicating with a second storage device 604. Second storage device 604 (as described above with respect to storage device 108) may be the same type of storage device as storage device 108 or the second storage device may be a different type. Similar to storage device 108, second storage device 604 may comprise one or each of a second boot configuration file 606 (as described above with respect to boot configuration file 110), a second primary image 608 (as described above with respect to primary image 116), and a second secondary image 610 (as described above with respect to secondary image 118).

The FIG. 6 embedded system 600 comprises a boot controller 612 (similar to the above described boot controller 120. Operation of boot controller 612 differs from boot controller 120 in that the FIG. 6 boot controller operates to check both storage device reader 106 and second storage device reader 602 for a boot configuration file, primary image, and secondary image, as appropriate.

The embodiments are related to the use of embedded system 100, such as the illustrated system of FIG. 1, to automatically generate a boot configuration file. According to an embodiment, the boot configuration file is automatically generated by embedded system 100 in response to processing device 102 executing sequences of instructions contained in memory 104 in response to information obtained from storage device reader 106. Such instructions may be read into memory 104 from another computer-readable medium.

However, the computer-readable medium is not limited to devices such as memory 104. For example, the computer-readable medium may comprise a floppy disk, a flexible disk, hard disk, magnetic tape, or another magnetic medium, a compact disc-read only memory (CD-ROM), another optical medium, punch cards, paper tape, another physical medium with patterns of holes, a random access memory (RAM), a programmable read only memory (PROM), an electrically programmable ROM (EPROM), a FLASH-EPROM, another memory chip or cartridge, a carrier wave embodied in an electrical, electromagnetic, infrared, or optical signal, or another medium from which a computer can read. Execution of the sequences of instructions contained in memory 104 causes processing device 102 to perform the process steps described below. In alternative embodiments, hard-wired circuitry may be used in place of or in combination with computer software instructions to implement the described embodiments. Thus, embodiments are not limited to a specific combination of hardware circuitry and software.

It will be readily seen by one of ordinary skill in the art that the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. A system for multi-profile boot selection of an embedded device, comprising:
   a storage device reader for communicating with a removable first storage device;
   a processing coupled with the storage device reader; and
   a memory coupled with the processing device, wherein the memory stores instructions comprising a boot controller which, when executed by the processing device, interacts with the storage device reader and automatically generates, via the processing device, and stores on the first storage device, a default boot configuration file based on determining a failure from interaction with the storage device reader, wherein the boot controller failure determination occurs if a query of the storage device reader indicates the first storage device is presently connected and in communication with the storage device reader and the first storage device fails to comnrise a first boot configuration file.

2. The system of claim 1, wherein the boot controller failure determination occurs if a query of the storage device reader indicates the first storage device is presently connected and in communication with the storage device reader and the first storage device comprise a corrupt boot image.

3. The system of claim 1, wherein the boot controller failure determination occurs if a query of the storage device reader indicates: one or more storage devices connected and in communication with the storage device reader and each of the one or more storage devices fails to comprise a corresponding boot configuration file.

4. The system of claim 1, wherein the boot controller failure determination occurs if a query of the storage device reader indicates one or more storage devices connected and in communication with the storage device reader and each of the one or more storage devices comprises a corresponding corrupt boot image.

5. A method of generating a default boot configuration file for an embedded device having a storage device reader for communicating with a removable storage device, a processing device operatively coupled with the storage device reader, and a memory connected with the processing device, the method comprising:

automatically generating, via the processing device, a default boot configuration file if a query of the storage device reader indicates a failure, wherein the query of the storage device reader comprises determining if the storage device comprises a primary image referenced by the boot configuration file in the storage device.

6. The method of claim 5, wherein the indicated failure is an absence of a first storage device.

7. The method of claim 5, wherein the default boot configuration file is generated in the memory.

8. The method of claim 5, wherein the indicated failure is the presence of a first storage device and the absence of a boot configuration file in the first storage device.

9. The method of claim 5, wherein the indicated failure is the presence of a first storage device having a boot configuration file and the absence of a primary image.

10. The method of claim 5, wherein the indicated failure is the presence of a first storage device having a boot configuration file and the presence of a corrupt primary image.

11. The method of claim 5, wherein the query of the storage device reader comprises:

determining if a storage device in the storage device reader comprises a boot configuration file, if the storage device reader is in communication with the storage device.

12. The method of claim 5, comprising:

booting the primary image in the storage device connected with the storage device reader based on the generated default boot configuration file.

13. The method of claim 5, comprising:

booting a secondary image in the storage device connected with the storage device reader based on the generated default boot configuration file if a primary image in the storage device is absent or corrupt.

14. The method of claim 5, comprising:

displaying the generated default boot configuration file to a user.

15. A memory or a computer-readable storage medium storing instructions which, when executed by a processor, cause the processor to automatically generate and store, on a removable storage device, a default boot configuration file if a query of a storage device reader indicates the removable storage device is presently connected and in communication with the storage device reader and the removable storage device fails to comprise a first boot configuration file.

* * * * *

UNITED STATES PATENT AND TRADEMARK OFFICE
CERTIFICATE OF CORRECTION

PATENT NO. : 7,676,671 B2 Page 1 of 1
APPLICATION NO. : 11/554761
DATED : March 9, 2010
INVENTOR(S) : Robert M. Van Rooyen It is certified that error appears in the above-identified patent and that said Letters Patent is hereby corrected as shown below:

In column 6, line 64, in Claim 1, after "processing" insert -- device --.

In column 7, line 10, in Claim 1, delete "comnrise" and insert -- comprise --, therefor.

Signed and Sealed this

Twenty-seventh Day of July, 2010

David J. Kappos
*Director of the United States Patent and Trademark Office*